April 7, 1953 C. E. BESSEY 2,634,329

INTERCARRIER-VIDEO TYPE TELEVISION RECEIVER

Filed Jan. 21, 1949

INVENTOR:

Carlton E. Bessey,

By Dawson, Ooms, Booth and Spangenberg,

Attorneys.

Patented Apr. 7, 1953 2,634,329

UNITED STATES PATENT OFFICE 2,634,329

INTERCARRIER-VIDEO TYPE TELEVISION RECEIVER

Carlton E. Bessey, North Long Branch, N. J.

Application January 21, 1949, Serial No. 71,848

11 Claims. (Cl. 178—5.8)

Figure 1:
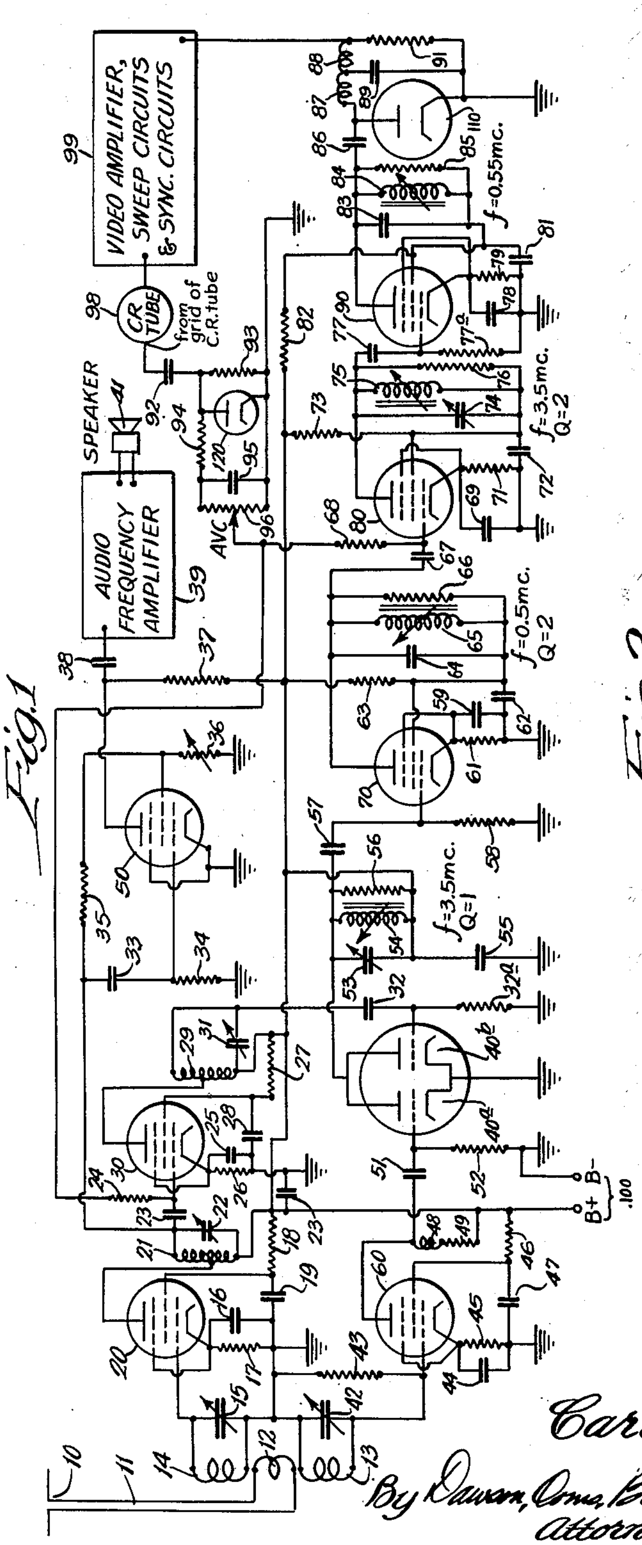

This invention relates to radio receivers; in particular, it concerns an improved and simplified system for receiving the sound and picture signals transmitted by standard television broadcasting stations.

A television signal, as transmitted from a broadcast station, is extremely complex. A television station is normally assigned a channel in the frequency spectrum having a total width of 6 megacycles; that is, for example, a particular station might be assigned a channel extending from 54 to 60 megacycles. Two carrier signals are transmitted within that spectrum by the transmitting station; these are respectively the sound carrier and the picture carrier. The sound carrier usually is on a frequency 0.25 megacycle lower than the upper edge of the assigned channel; in the example given, the sound carrier would be at 59.75 megacycles. The picture carrier is normally on a frequency 4.5 megacycles lower than the sound carrier; in the example given, therefore, the picture carrier would be on 55.25 megacycles.

Frequency modulation is applied to the sound carrier for the transmission of the voice program normally accompanying a television picture. Amplitude modulation is employed on the picture carrier to transmit the video impulses which, at the receiver, are used to "paint" the picture on a cathode-ray tube. The spectrum of the FM sound signal is normally 200 to 300 kilocycles wide, 100 to 150 kilocycles on each side of the sound carrier, and it is thus confined within the upper edge of the assigned channel. The side-band components produced by amplitude modulation of the picture carrier extend, in theory, from a few cycles per second to about 4 megacycles per second. As a practical matter, very low frequency video components are of no practical importance, and the significant range of video frequencies is from about one hundred cycles per second to about 4 megacycles per second. Amplitude modulation normally produces side-bands distributed symmetrically on either side of the carrier frequency. In television practice, in order to prevent excessive channel width, the lower video side-band is partially suppressed at the transmitter, so that no signals of appreciable amplitude are transmitted on frequencies lower than the lower edge of the assigned channel. The upper side-band is transmitted fully, without suppression.

Conventional television receivers employ the superheterodyne circuit; a radio-frequency amplifier and mixer circuit is provided having a pass-band which can accommodate the entire frequency range occupied by the transmitted television signal. The signal from a local oscillator within the receiver is mixed with the television signal, and the resulting difference frequencies are amplified in separate I. F. amplifiers. The sound I. F. amplifier is designed to have relatively sharp response, so that it accepts and amplifies the sound carrier with its FM side-band components but rejects the video signals. The video I. F. amplifier is designed to have wide-band characteristics so as to amplify the video signal; so far as practicable, the limits of its pass band are chosen to reject the sound signal.

The major practical difficulty in the present-day television receiver lies in the local oscillator. Frequency stability in that oscillator is of the very greatest importance. If the oscillator drifts after the receiver has once been tuned to a particular station, both the sound and the picture will be adversely affected. The sound I. F. channel is quite narrow, and accordingly only a small frequency drift by the local oscillator is necessary to de-tune the sound channel completely or to such an extent that quality of reproduction is badly impaired. Local oscillator drift affects the picture by causing the I. F. amplifier to reject a portion of the video spectrum or, if the drift is in the direction which brings the sound carrier into the pass band of the picture I. F. amplifier, the presence of the unwanted sound carrier in the video signal spoils the picture by cross-hatching it with black lines or other spurious markings on the screen of the picture tube.

Engineers have long been well aware that local oscillator drift should be avoided, but no practical means of preventing it in an inexpensive receiver has existed. Crystal control for the local oscillator is the best solution, but it is prohibitively expensive for all except the highest priced receivers. Various systems of automatic frequency control have been suggested, but they are expensive and their reliability has not been good. The frequency of the local oscillator is necessarily of the same order of magnitude as the television carrier frequencies—that is, local oscillator frequency will normally range between approximately 40 and 250 megacycles per second, according to the particular television channel being tuned in. Even though great care may be employed in the design of the circuit and the choice of components, it is extremely difficult and expensive to design a self-excited oscillator for such frequencies which will not drift to an extent which is intolerable for television reception.

The practical consequence of local oscillator drift in television receivers is that the "viewer" must, every few minutes, re-tune the receiver. This is, of course, most irritating and inconvenient.

I have approached the solution of this problem from a new direction. I have undertaken to provide a television receiver which has no local oscillator. By eliminating that component, I have ended the problem of receiver drift and have accomplished good reception of television signals with a much simpler circuit than has heretofore been required.

Accordingly, one of the major objects of this invention is to provide a television receiver, having the benefits of the superheterodyne circuit, which has no local oscillator.

Another object of my invention is to provide a television receiver wherein the receiver drift characteristic of prior-art receivers has been entirely eliminated.

A further object of my invention is to provide a television receiver employing fewer components and a more simple circuit than has been previously required to accomplish similar results.

A still further object of my invention is to provide a television receiver in which the sound carrier is suitably amplified and filtered and thereupon mixed with the picture carrier and the video side-band components to provide an I. F. signal for amplification by the picture I. F. amplifier.

Still another object of my invention is to provide a television receiver wherein the sound reception is accomplished by a simple circuit while reception of video signals is accomplished by a superheterodyne circuit employing the sound carrier, suitably amplified and filtered, in lieu of a local oscillator.

Other objects and advantages of my invention will appear as the specification proceeds.

Figure 2:
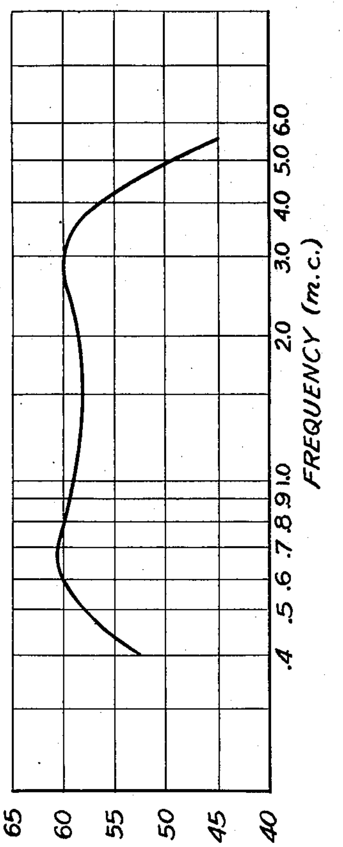

I have illustrated one illustrative embodiment of my invention in the accompanying drawing, of which Figure 1 is a schematic and diagrammatic showing of a television receiver made according to my invention; and Fig. 2 is a graph showing the frequency-response characteristics of a typical I. F. amplifier designed in accordance with my invention.

As shown in Fig. 1, signals are intercepted on an antenna 10, which may be a broad-band dipole or other suitable antenna. A transmission line 11 couples the antenna to an input coil 12 which is, in turn, inductively coupled to coils 13 and 14. The inductive coupling between coils 12 and 13 should be relatively close, while the coupling between coil 12 and coil 14 should be very loose.

Coil 14 is shunted by a condenser 15, which may be variable, to form a tank circuit. One side of condenser 15 is grounded; the other terminal is connected to the control grid of tube 20, which functions as a radio-frequency amplifier for the sound signals.

Tank circuit 14, 15 is a high-Q circuit, and its resonant frequency is set to that of the sound carrier.

The suppressor grid and cathode of tube 20 are connected together, and they are connected to ground through R. F. by-pass condenser 16. Condenser 16 is shunted by cathode-biasing resistor 17. The screen grid of tube 20 is connected to the positive side of D.-C. voltage source 100 through de-coupling resistor 18. The negative side of voltage source 100 is grounded. The screen grid of tube 20 is by-passed to ground by condenser 19.

The plate load circuit of tube 20 comprises a high-Q tank circuit made up of coil 21 and condenser 22, which may be variable. One terminal of tank circuit 21, 22 is connected to the positive side of voltage source 100. The plate of tube 20 is connected to a tap on coil 21 near the end connected to voltage source 100. A by-pass condenser 23 is connected between the positive side of voltage source 100 and ground.

The other side of tank circuit 21, 22 is connected through grid coupling condenser 23 to the control grid of tube 30. The control grid is also connected through resistor 24 with the AVC circuit which will be hereinafter described.

The suppressor grid of tube 30 is connected to the cathode and they are connected to ground through R. F. by-pass condenser 25. Condenser 25 is shunted by cathode-biasing resistor 26. The screen grid of tube 30 is connected to the positive side of voltage source 100 through de-coupling resistor 27; and the screen grid of tube 30 is by-passed to ground through condenser 28. A very high-Q tank circuit is formed by coil 29 and condenser 31, which may be variable. One side of that tank circuit is connected to the positive side of voltage source 100; its other side is connected through coupling condenser 32 to the control grid of tube 40b. The plate of tube 30 is connected to a tap on coil 29 near the end thereof which is connected to voltage source 100.

As will be hereinafter more fully described under "operation," tank circuit 21, 22 is tuned to a frequency a few hundred kilocycles higher or lower than that of the sound carrier, while tank circuit 29, 31 is normally tuned squarely to the sound carrier, although, as will be hereinafter more fully described, it may on occasion be tuned somewhat off the sound carrier on the other side of the sound carrier from tank circuit 21, 22.

The junction of condensers 23 and 22 is connected through coupling condenser 33 to the control grid of tube 50. Grid resistor 34 is connected between the control grid of tube 50 and ground. The suppressor grid and cathode of tube 50 are connected together and grounded. Resistor 35 connects the junction of condensers 22 and 23 to the screen grid of tube 50, and a variable resistor 36 is connected between the screen grid of tube 50 and ground. The plate of tube 50 is connected through load resistor 37 to the positive side of voltage source 100, and a coupling condenser 38 connects the plate of tube 50 to the input of an audio-frequency amplifier 39 which, being conventional, is shown diagrammatically in Fig. 1. Amplifier 39 is connected to a conventional speaker 41.

Coil 13 is shunted by a condenser 42 to form a tank circuit, and it is also shunted by a loading resistor 43. As a result of the loading effect of resistor 43 and the close coupling existing between coils 13 and 12, tank circuit 13, 42 is quite broad in its frequency response. One side of tank circuit 13, 42 is grounded, and the other side is connected to the control grid of tube 60. The suppressor grid and cathode of tube 60 are connected together and they are in turn connected to ground through R. F. by-pass condenser 44. Condenser 44 is shunted by cathode-biasing resistor 45. The screen grid of tube 60 is connected through de-coupling resistor 46 to the positive terminal of voltage source 100, and the screen grid of tube 60 is connected to ground through by-pass condenser 47. The plate load circuit of tube 60 comprises a radio-frequency choke coil 48 and a load resistor 49, connected in series. One end of resistor 49 is connected to the positive side of voltage source 100, while the open end of choke coil 48 is connected to the plate of tube 60.

The plate of tube 60 is connected through coupling condenser 51 to the control grid of tube 40*a*. The control grid of tube 40*a* is connected to ground through grid resistor 52.

Tubes 40*a* and 40*b* are triodes which may, if desired, be mounted within a single envelope as indicated on the drawing. The cathodes of tubes 40*a* and 40*b* are connected together and grounded. The plates of tubes 40*a* and 40*b* are connected together and are connected to one side of the tank circuit comprising condenser 53 and coil 54. The other side of tank circuit 53, 54 is connected to the positive side of voltage source 100 and is also connected to ground through by-pass condenser 55. Condenser 53 and coil 54 may each be variable as shown in the drawing. Tank circuit 53, 54 is shunted by a loading resistor 56 which may be so chosen as to reduce the effective "Q" of the circuit to unity. In a typical embodiment of my invention, tank circuit 53, 54 may be tuned to resonate at 3.5 megacycles, as indicated on the drawing.

The control grid to tube 40*b* is connected to ground through resistor 32*a*.

The plates of tubes 40*a* and 40*b* are connected through coupling condenser 57 to the control grid of tube 70. The control grid of tube 70 is connected to ground through resistor 58. The suppressor grid of tube 70 is connected to its cathode, and they are connected to ground through by-pass condenser 59. Condenser 59 is shunted by cathode-biasing resistor 61. The screen grid of tube 70 is connected to ground through by-pass condenser 62. and is connected through de-coupling resistor 63 to the positive side of voltage source 100.

The plate of tube 70 is connected to one side of a tank circuit comprising condenser 64 and coil 65. The other side of tank circuit 64. 65 is connected to the screen grid of tube 70. A loading resistor 66 is shunted across tank circuit 64, 65 to reduce its effective "Q" to a value of about 2. The coil 65 may be a variable inductance as shown in the drawing. and condenser 64 may, if desired, be made variable. In the typical embodiment illustrated. the resonant frequency of tank circuit 64, 65 should be 0.5 megacycle.

The plate of tube 70 is connected through coupling condenser 67 to the control grid of tube 80, and that control grid is connected through resistor 68 to the AVC circuit to be described hereinafter. The cathode and suppressor grid of tube 80 are connected together, and are grounded through by-pass condenser 69. Condenser 69 is shunted by cathode-biasing resistor 71. The screen grid of tube 80 is connected to ground through by-pass condenser 72 and to the high voltage side of voltage source 100 through decoupling resistor 73. The plate of tube 80 is connected to one side of a tank circuit comprising condenser 74 and coil 75. Either or both of these elements may be variable, as shown in the drawing. The other side of tank circuit 74, 75 is connected to the screen grid of tube 80. Tank circuit 74, 75 is shunted by loading resistor 76, which may be chosen to have a value such that the effective "Q" of tank circuit 74, 75 is about 2, and in the typical embodiment shown the resonant frequency of tank circuit 74, 75 should be 3.5 megacycles.

The plate of tube 80 is connected through coupling condenser 77 to the control grid of tube 90, and the control grid of tube 90 is connected to ground through grid resistor 77*a*. The suppressor grid and cathode of tube 90 are connected together and are grounded through by-pass condenser 78. Condenser 78 is shunted by cathode-biasing resistor 79. The screen grid of tube 90 is connected to ground through by-pass condenser 81 and is connected to the positive side of voltage source 100 through de-coupling resistor 82. The plate of tube 90 is connected to one side of a tank circuit comprising condenser 83 and coil 84, either or both of which may be variable. The other side of tank circuit 83, 84 is connected to the screen grid of tube 90. A loading resistor 85 is shunted across tank circuit 83, 84, and its value may be chosen to give tank circuit 83, 84 an effective "Q" of unity. In the typical embodiment shown, the resonant frequency of tank circuit 83, 84 should be 0.55 megacycle.

The plate of tube 90 is connected through coupling condenser 86 to the plate of diode detector tube 110. The cathode of diode 110 is grounded. A low-pass filter consisting of choke coils 87 and 88 in series is connected between the plate of diode 110 and one terminal of detector load resistor 91. The other terminal of load resistor 91 is grounded. A condenser 89, forming part of the low-pass filter, is connected between ground and the junction of coils 87 and 88.

The ungrounded side of load resistor 91 is connected to the input of a video amplifier 99, with associated sweep and synchronizing circuits for the cathode-ray tube 98 driven by the video amplifier. Since these last-mentioned elements are conventional, they are shown diagrammatically on Fig. 1.

The AVC circuit, which has been referred to, is operated from the intensity grid of the cathode-ray tube. As shown in Fig. 1, a coupling condenser 92 is connected between the intensity grid of the cathode-ray tube 98 and the plate of diode 120. The cathode of diode 120 is grounded. A high resistance 93, which may be of several megohms value, is shunted between the plate and cathode of diode 120. A low-pass filter comprising resistor 94 and condenser 95 is connected between the plate of diode 120 and ground, and a potentiometer 96 is shunted across condenser 95. The resistance of both element 94 and potentiometer 96 should be of high ohmic value. The variable tap on potentiometer 96 is connected to the control grid of tube 30 through resistor 24 and to the control grid of tube 80 through resistor 68.

*Operation*

Before taking up the operation in detail, I shall review briefly the functions of the various tubes in the circuit shown in Fig. 1. Tube 60 is a radio-frequency amplifier adjusted to give maximum and substantially equal response to the picture carrier and its associated side-band components. Tube 20, on the other hand, is a radio-frequency amplifier having a high-Q tuned grid circuit and adjusted to respond to the sound carrier and its side-band components. Tube 30 is a high-gain amplifier tube associated with a sharp band-pass filter which has the function of amplifying the sound carrier and discriminating against its associated side-band components. Tube 50 is the sound detector tube, operating as a regenerative amplifier and employing slope detection to derive an audio envelope from the frequency-modulated signal fed to its input.

Tubes 40a and 40b collectively form a non-linear mixer circuit, the function of which is to combine the picture carrier and its side-band components with the sound carrier after it has been amplified and stripped of its side-band components. Tubes 70, 80, and 90 comprise a stagger-tuned I. F. amplifier designed to give substantially flat response over the band between 0.5 megacycle and 4 megacycles, to discriminate sharply against frequencies lower than 0.5 megacycle, and to drop at the high frequency end at such a rate that the response at 4.5 megacycles is 6 db below the average response. Tube 110 is a conventional diode detector tube; similarly tube 120 is a conventional diode rectifier having the function of rectifying the video signal voltage to supply control voltage for AVC purposes.

I shall now review the operation of my receiving system in somewhat more detail. The amplifier tube 20 operates with its grid circuit tuned to the sound carrier; the pass band of tank circuit 14, 15, while sharp enough to suppress the video signals, will pass the sound carrier and the FM side-band components readily. Tank circuit 21, 22, which is loosely coupled to the plate of tube 20, is a high-Q circuit which is adjusted for slope detection—that is, its resonant frequency is set to a frequency removed from the sound carrier by perhaps 200 kilocycles. The frequency modulation of the sound carrier causes a differential response in tank circuit 21, 22, the developed voltage being greater when the frequency swings toward the resonance peak and less when the frequency swings away from the resonance peak. This results in changes in the average grid voltage of tube 50 which correspond to the audio envelope of the voice signal being transmitted, and those audio voltage variations produce corresponding changes in the plate current of tube 50. As a result, an audio voltage is developed across plate load resistor 37 and is fed to and amplified by amplifier 39.

The voltage across tank circuit 21, 22 is also applied to the control grid of tube 30. The plate circuit of tube 30, however, is connected to a very sharp, high-Q circuit which is preferably tuned to the exact frequency of the sound carrier. In certain cases, it may be desirable, in order to maintain tube 30 in a condition of complete stability, to have circuit 29, 31 tuned off the sound carrier in the opposite direction from the deviation of tank circuit 21, 22. If this is done, however, a supplemental band-pass filter, which may consist of one or more sharply-tuned circuits and, if desired, another coupling tube, should be connected between the output of tank circuit 29, 31 and the grid of tube 40b. The object of tank circuit 29, 31, or of an additional, supplemental band-pass filter, if one be used, is to attenuate the FM side-band components which are initially received from the television transmitting station and to obtain an amplified signal which is predominantly the sound carrier.

Complete suppression of the FM side-band components is, of course, not practicable except by the use of a very elaborate circuit. I have found, however, that complete suppression of the side-band components is not necessary; it is sufficient if they are attenuated relative to the sound carrier so that the strongest of them remains at a power level of the order of 10 to 12 db below the sound carrier level.

The amplitude of the sound carrier, as applied to the grid of tube 40b, will normally be several volts. As a result, it accomplishes efficiently conversion of the picture signal applied to the grid of tube 40a from its original carrier frequency to a new carrier frequency equal to the difference between the transmitted picture carrier and the sound carrier. This difference is normally 4.5 megacycles, and the signal fed into the input of tank circuit 53, 54 thus consists of the I. F. "carrier" of 4.5 megacycles, the complete side-band ranging from 4.5 megacycles down to a few hundred kilocycles, and the "residual side-band" which ranges from 4.5 megacycles to about 5.75 megacycles.

Amplification of the residual side-band is not necessary; in fact, it is desirable that it be attenuated relative to the major side-band. Accordingly, the I. F. amplifier following the mixer circuit should respond readily to and amplify equally frequencies between about 0.5 megacycles and 4 megacycles and should cut off fairly rapidly outside that band. The I. F. amplifier shown in Fig. 1 accomplishes that result and provides an over-all gain of about 60 db Fig. 2 shows the response of that amplifier, plotted with gain in decibels as the dependent variable and with frequency in megacycles per second as the independent variable.

From an examination of Fig. 2 it will be seen that a typical amplifier is flat within about 2 db for all frequencies between 0.5 megacycle and 3.8 megacycles; and the response at 4 megacycles is down only about 3 db from the maximum.

The low-pass filter associated with diode detector tube 110 is effective to suppress from the detected video signal any frequency components on the high side of 4.5 megacycles which remain after the signal has passed through the video amplifier, and accordingly the video signal fed to amplifier 99 faithfully reproduces the video envelope transmitted by the television station.

The AVC voltage may be obtained by any convenient means; in the illustrated embodiment I chose to rectify the video signal voltage on the grid of the picture tube. By appropriate setting of potentiometer 96, a satisfactory automatic volume control of both the sound and the picture sections of the receiver can be obtained.

I have, as a matter of convenience and for the purpose of keeping the schematic diagram clearly readable, shown the various signal-frequency circuits as being independently tunable. In practical embodiments of my invention it will normally be desirable to provide several different circuits, pre-tuned for the television channels to be received, with one of the well-known switching methods employed for cutting in the set of circuits desired for reception of a particular television station.

While I have in this specification described in considerable detail a particular embodiment of my invention for illustrative purposes, it will be understood that those skilled in the art can make a large number of changes in details without departing from the spirit and basic principles of my invention. Accordingly, the scope of this invention is not to be considered as limited to the particular arrangement of components shown in the drawing, but is to be determined by reference to the appended claims.

I claim:

1. In a receiver adapted to receive a television signal comprising sound and picture carriers separated in frequency by a predetermined interval, said sound carrier having associated with it side-bands carrying sound intelligence and said picture carrier having associated with it side-bands carrying video intelligence, a first tunable input circuit normally tuned to the frequency of the sound carrier, an amplifier coupled to said input circuit, a tunable filter connected in circuit with said amplifier normally tuned to pass signals of the sound carrier frequency and to attenuate relatively thereto signals of other frequencies, a second tunable input circuit normally tuned to said picture carrier and its side-bands, a mixer circuit comprising an element having a non-linear voltage-current characteristic adapted to combine a signal of the sound carrier frequency derived from said amplifier and filter with the picture carrier and its side-bands, and circuit means coupling the filter and the second input circuit to said mixer.

2. In a receiver adapted to receive a television signal comprising sound and picture carriers separated in frequency by a predetermined interval, said sound carrier having associated with it side-bands carrying sound intelligence and said picture carrier having associated with it side-bands carrying video intelligence, a first tunable input circuit normally tuned to the frequency of the sound carrier, an amplifier coupled to said input circuit, a tunable filter connected in circuit with said amplifier normally tuned to pass signals of the sound carrier frequency and to attenuate relatively thereto signals of other frequencies, a second tunable input circuit normally tuned to said picture carrier and its sidebands, a mixer circuit comprising an element having a non-linear voltage-current characteristic adapted to combine a signal of the sound carrier frequency derived from said amplifier and filter with the picture carrier and its side-bands, circuit means coupling the filter and the second input circuit to said mixer, and an I. F. amplifier fed by the mixer circuit adapted to amplify selectively the difference-frequency signals generated therein.

3. In a receiver for reception of television signals comprising a sound carrier and a picture carrier differing in frequency by a predetermined amount, each of said carriers having side-bands associated therewith, a coil adapted for connection to an antenna, a first tunable input circuit coupled to said antenna coil and normally tuned to the frequency of the sound carrier, an amplifier coupled to said first input circuit, a tunable filter connected in circuit with said amplifier normally tuned to pass signals of the sound carrier frequency and to attenuate relatively thereto signals of other frequencies, a second input circuit coupled to said antenna coil normally tuned to respond selectively to the picture carrier and its side-bands, and mixer means comprising an element having a non-linear voltage-current characteristic and provided with two input channels, one of said input channels being fed with signals derived from said second input circuit and the other of said input channels being fed by signals derived from said amplifier and filter.

4. In a receiver for reception of television signals comprising a sound carrier and a picture carrier differing in frequency by a predetermined amount, each of said carriers having side-bands associated therewith, an antenna coil, a first input circuit coupled to said antenna coil and normally tuned to the frequency of the sound carrier, an amplifier coupled to said first input circuit, a filter connected in circuit with said amplifier normally tuned to pass signals of the sound carrier frequency and to attenuate relatively thereto signals of other frequencies, a second input circuit coupled to said antenna coil normally tuned to respond selectively to the picture carrier and its side-bands, mixer means comprising an element having a non-linear voltage-current characteristic and provided with two input chambers, one of said input channels being fed with signals derived from said second input circuit and the other of said input channels being fed by signals derived from said amplifier and filter, and an I. F. amplifier fed by said mixer means and responsive selectively to the difference-frequency signals generated in said mixer means.

5. In a receiver adapted to receive a television signal comprising sound and picture carriers separated in frequency by a predetermined interval, said sound carrier having associated with it side-bands carrying sound intelligence and said picture carrier having associated with it side-bands carrying video intelligence, a first tunable input circuit normally tuned to the frequency of the sound carrier, an amplifier coupled to said input circuit, a filter connected in circuit with said amplifier normally tuned to pass signals of the sound carrier frequency and to attenuate relatively thereto signals of other frequencies, a second input circuit responsive to said picture carrier and its side-bands, a mixer circuit comprising an element having a non-linear voltage-current characteristic adapted to combine a signal of the sound carrier frequency derived from said amplifier and filter with the picture carrier and its side-bands, circuit means coupling the filter and the second input circuit to said mixer, and detector means coupled to said first input circuit operative to derive audio-frequency signals from said sound carrier and its side-bands.

6. In a receiver for reception of television signals comprising a sound carrier and a picture carrier differing in frequency by a predetermined amount, each of said carriers having side-bands associated therewith, an antenna coil, a first input circuit loosely coupled to said antenna coil and normally tuned to the frequency of the sound carrier, an amplifier coupled to said first input circuit, a filter connected in circuit with said amplifier normally tuned to pass signals of the sound carrier frequency and to attenuate relatively thereto signals of other frequencies, a second input circuit tightly coupled to said antenna coil normally tuned to respond selectively to the picture carrier and its side-bands, and mixer means comprising an element having a non-linear voltage-current characteristic and provided with two input channels, one of said input channels being fed with signals derived from said second input circuit and the other of said input channels being fed by signals derived from said amplifier and filter.

7. A receiver for reception of television signals comprising a sound carrier and a picture carrier differing in frequency by a predetermined amount, each of said carriers having side-bands associated therewith, comprising a first input circuit selectively responsive to the sound carrier, a second input circuit selectively responsive to the picture carrier and its side-bands, a high-Q resonant filter coupled to the first input circuit operative to attenuate the side-bands of the sound carrier relative to said sound carrier, mixer means for mixing the sound carrier as filtered with the picture carrier and its side-bands, and circuit means for feeding the picture carrier and its side-bands and said filtered sound carrier to said mixer means.

8. A receiver for reception of television signals comprising a sound carrier and a picture carrier differing in frequency by a predetermined amount, each of said carriers having side-bands associated therewith, comprising a first input circuit selectively responsive to the sound carrier, a second input circuit selectively responsive to the picture carrier and its side-bands, a high-Q resonant filter operative to attenuate the side-bands of the sound carrier relative to said sound carrier, means for mixing the sound carrier as filtered with the picture carrier and its side-bands, circuit means for feeding said filtered sound carrier and said picture carrier and its side-bands to said mixer means, and an I. F. amplifier fed by the mixer means selectively responsive to the difference-frequency components of signal developed in said mixing means.

9. A receiver for reception of television signals comprising a sound carrier and a picture carrier differing in frequency by a predetermined amount, each of said carriers having side-bands associated therewith, comprising an input circuit selectively responsive to the sound carrier and its side-bands, a second input circuit selectively responsive to the picture carrier and its side-bands, detector means coupled to the input circuit operative to derive audio-frequency signals from said sound carrier and its side-bands, resonant filter means coupled to said input circuit operative to attenuate the side-bands of the sound carrier relative to said sound carrier, and means for mixing the sound carrier as filtered with the picture carrier and its side-bands.

10. A television receiver for reception of television signals comprising a sound carrier and a picture carrier differing in frequency by a predetermined amount, each of said carriers having side-bands associated therewith, comprising an input circuit selectively responsive to the sound carrier and its side-bands, a second input circuit selectively responsive to the picture carrier and its side-bands, detector means coupled to the input circuit operative to derive audio-frequency signals from said sound carrier and its side-bands, high-Q resonant filter means coupled to the input circuit operative to attenuate the side-bands of the sound carrier relative to said sound carrier, means for mixing the sound carrier as filtered with the picture carrier and its side-bands, circuit means for feeding said filtered sound carrier and said picture carrier and side-bands to said mixer means, and an I. F. amplifier fed by said mixer means responsive selectively to the difference-frequency components of signal developed in said mixing means.

11. In a television receiver for reception of television signals comprising a sound carrier and a picture carrier differing in frequency by a predetermined amount, each of said carriers having side-bands associated therewith, a tuned input circuit normally tuned to respond selectively to the sound carrier frequency, an amplifier coupled to said input circuit, a tuned input circuit normally tuned to respond selectively to the picture carrier and its side-bands, mixer means fed by the amplifier and the second input circuit, and an I. F. amplifier fed by the mixer and responsive selectively to the difference-frequency signals generated in said mixer, comprising an I. F. carrier equal in frequency to the difference between the carrier frequencies, and side-band components derived from the side-bands of the picture carrier.

CARLTON E. BESSEY.

REFERENCES CITED

The following references are of record in the file of this patent:

UNITED STATES PATENTS

| Number | Name | Date |
|---|---|---|
| 1,885,009 | Day | Oct. 25, 1932 |
| 2,086,961 | Schlesinger | July 13, 1937 |
| 2,108,878 | Wright | Feb. 22, 1938 |
| 2,109,561 | Wright | Mar. 1, 1938 |
| 2,154,907 | Lewis | Apr. 18, 1939 |
| 2,227,822 | Campbell | Jan. 7, 1941 |
| 2,448,908 | Parker | Sept. 7, 1948 |
| 2,505,843 | Smith | May 2, 1950 |